(12) United States Patent
Webb et al.

(10) Patent No.: US 7,395,575 B1
(45) Date of Patent: Jul. 8, 2008

(54) CONTACT LENS TREATMENT APPARATUS HAVING LENS CAPTURE PROJECTIONS

(75) Inventors: Nicholas Webb, Redding, CA (US); John Zeis, San Marcos, CA (US); Scott Castanon, San Marcos, CA (US)

(73) Assignee: Isoclear, Inc., Chicago, IL (US)

( * ) Notice: Subject to any disclaimer, the term of this patent is extended or adjusted under 35 U.S.C. 154(b) by 0 days.

(21) Appl. No.: 11/809,641

(22) Filed: Jun. 1, 2007

Related U.S. Application Data

(60) Provisional application No. 60/899,459, filed on Feb. 5, 2007.

(51) Int. Cl.
*G02C 13/00* (2006.01)
*B08B 11/00* (2006.01)

(52) U.S. Cl. ..................... 15/104.92; 15/214
(58) Field of Classification Search ............... 15/104.92, 15/214, 244.1; 206/5.1
See application file for complete search history.

(56) References Cited

U.S. PATENT DOCUMENTS

| | | | |
|---|---|---|---|
| 5,086,913 A | 2/1992 | Camm et al. |
| 5,227,039 A | 7/1993 | Pankow |
| 5,368,708 A | 11/1994 | Pankow |
| 5,439,572 A | 8/1995 | Pankow |
| 5,452,792 A | 9/1995 | Zautke et al. |
| 5,529,678 A | 6/1996 | Pankow |
| 5,657,506 A | 8/1997 | Pankow |
| 5,783,532 A | 7/1998 | Huth |
| 5,891,258 A | 4/1999 | Pankow |
| 6,134,736 A | 10/2000 | Pankow |
| 6,138,312 A | 10/2000 | Cummings |
| 6,280,530 B1 | 8/2001 | Pankow |
| 6,343,399 B1 | 2/2002 | Pankow |
| 6,435,339 B1 | 8/2002 | Kroupa |
| 6,662,397 B2 | 12/2003 | Pankow |
| 2005/0133382 A1* | 6/2005 | Gerard et al. ................ 206/5.1 |

* cited by examiner

*Primary Examiner*—Randall Chin
(74) *Attorney, Agent, or Firm*—Eugene M. Cummings, P.C.

(57) ABSTRACT

A limited use apparatus for treating contact lenses is disclosed. The apparatus comprises a case having a body and a left and right cover which are joinable to form chambers for receiving the lenses. Each of the chambers has an operative face for receiving the lens. A reactive layer is provided on a portion of each operative face. The operative faces and the reactive layers are dimensioned and arranged whereby the reactive layers come into engagement with respective optical surfaces of a lens positioned there-between when the cover and body are joined together.

3 Claims, 7 Drawing Sheets

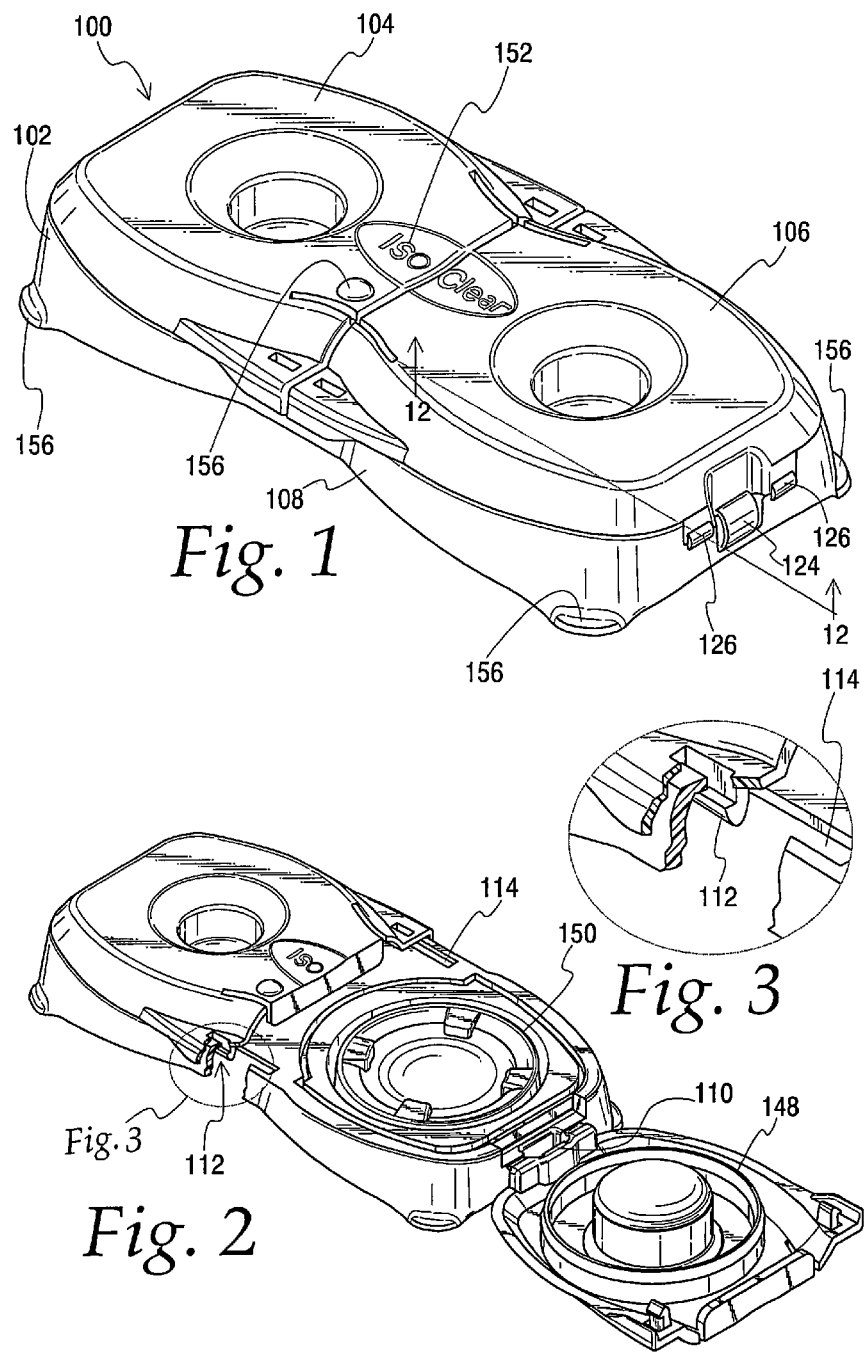

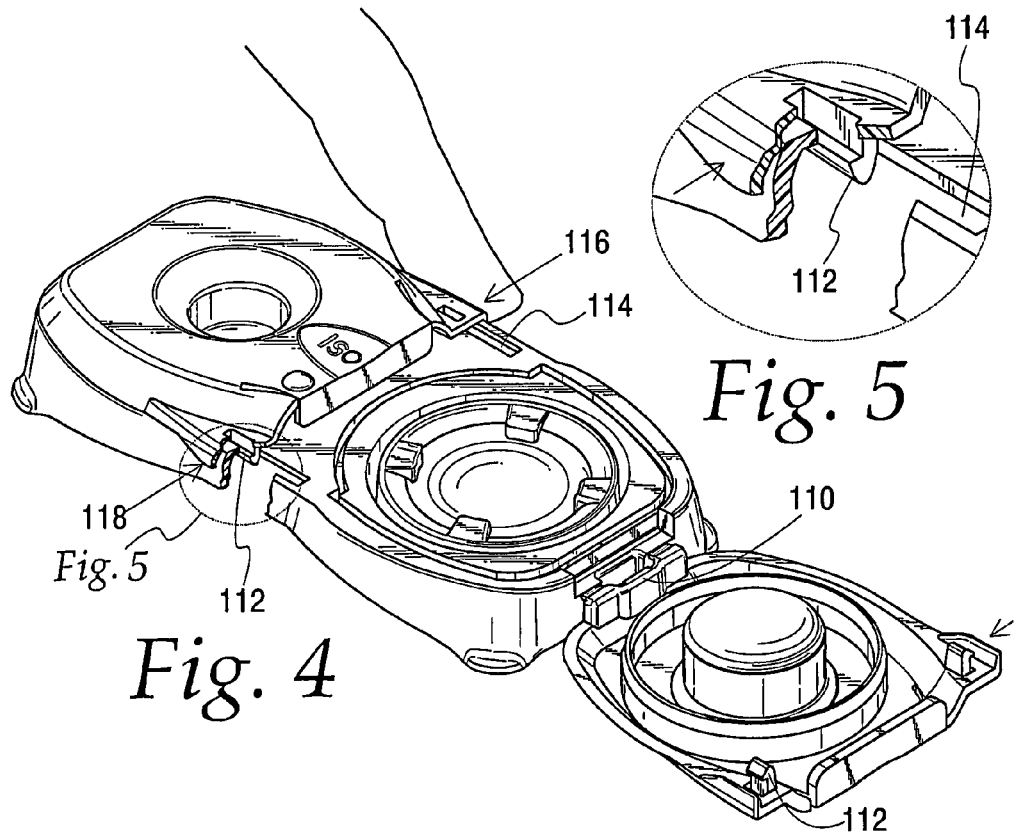
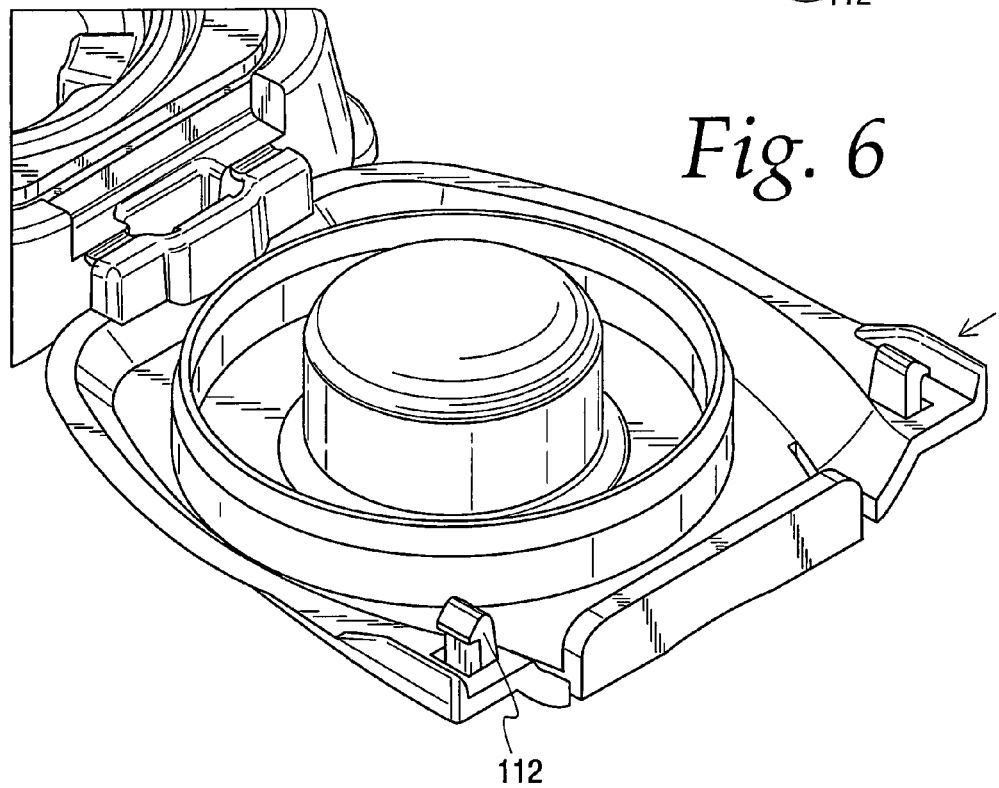

CONTACT LENS TREATMENT APPARATUS HAVING LENS CAPTURE PROJECTIONS

CROSS-REFERENCE TO RELATED APPLICATIONS

This application claims benefit under 35 U.S.C. § 119(e) of U.S. Provisional Application entitled "LIMITED USE CONTACT LENS TREATMENT APPARATUS," filed on Feb. 5, 2007, having Ser. No. 60/899,459, the complete disclosure thereof being incorporated by reference.

FIELD OF THE INVENTION

The present invention is directed to an apparatus and method for treating contact lenses. More particularly, the invention is directed to a stand-alone apparatus and method for using same by which contact lenses can be cleaned. In a particularly advantageous form, the apparatus is of limited use and disposable, and comprises a case including a pair of closable liquid sealed containers sized and shaped to accept and retain a lens therein such that the lens is brought into contiguous wetted contact with a reactive layer during the treatment process.

DESCRIPTION OF THE PRIOR ART

Contact lenses have come into wide use for both correcting a wide range of vision deficiencies as well as cosmetics purposes. Depending on the purpose for which a particular pair of contact lenses has been designed, different geometries may be used. For instance, both spherical and toric lenses are in widespread use. In addition, a contact lens may be made from a single piece of optically conductive material—usually plastic—or may be made from two or more pieces of optically conductive material fused together. Regardless of the particular geometry and construction present in a pair of contact lenses, certain features are necessitated by the requirement that contact lenses fit comfortably over a wearer's eyes. In particular, a contact lens must have a convex exterior surface, and concave interior surface (where the interior surface is that which is pressed to the eye, and the exterior surface is that which is pointed out from the eye).

Depending on the material used to construct the lenses, the lenses may be either "hard" or "soft". Hard contact lenses, which are comparatively more rigid, are typically formed from a relatively hydrophobic material such as polymethyl methacrylate (PMMA). Soft contact lenses, which are comparatively more pliant, are typically formed from a relatively hydrophilic polymer such as hydroxyethylmethacrylate (HEMA), which has the property of being able to absorb and bind a proportionately large amount of water within a polymer network. Soft contact lenses formed from such hydrophilic polymers, when hydrated, are generally believed to be more comfortable to wear than hard lenses because they conform better to the cornea of the eye and usually cause less irritation when worn for extended periods. For this reason, the great majority of contact lenses presently prescribed are soft contact lenses.

For wearing comfort, it is necessary that soft contact lenses be maintained uniformly wetted at all times. While on the eye, the moisture content of the hydrophilic material of the lenses is maintained by fluid released by the tear ducts of the wearer. However, when the lenses are removed for an extended period, as for cleaning or while sleeping, the lenses may dry out and become irreversibly damaged unless they are externally hydrated. For this reason, soft contact lenses are usually kept in special cases designed to maintain an acceptable level of hydration.

In addition to requiring hydration, soft contact lenses must be periodically cleaned. While in use soft contact lenses collect contaminants from the eye and its environment. These contaminants may include proteins and lipids, including denatured ones, from the tear fluid of the eye, and foreign substances such as cosmetics, soaps, airborne chemicals, dust and other particulate matter. Unless periodically removed, these contaminants may damage the wearer's eye, either directly through physical abrasion, or indirectly by serving as nutrients for harmful bacteria.

Consequently, various apparatus and methods have been developed for cleaning and hydrating soft contact lenses. For example, cleaning apparatus have been provided wherein the lenses are submersed in a variety of liquid cleaning agents, such as surfactants, oxidants, disinfectants, enzymatic cleaners, or abrasives. Other cleaning apparatus have been provided which included mechanically operated or electrically powered components for vibrating, rotating, abrading, scrubbing, heating, agitating, subjecting to ultrasonic energy, or otherwise manipulating the lenses to enhance the cleaning efficacy of a cleaning agent.

Furthermore, certain prior lens cleaning apparatus and methods go a step further and require added post-cleaning lens treatment procedures. An important concern relating to the enzymatic cleaning systems currently being used is the need to remove the enzymatic matter prior to placing the cleaned lens in the eye—wearing a lens contaminated with enzymatic matter can injure the wearer's eye. Accordingly, users of enzymatic cleaners have been advised to thoroughly rinse their contact lenses free of cleaning enzyme prior to using them. This rinsing step, however, requires user compliance to be effective. Unfortunately, users may consider such rinsing unnecessary, and/or may not be able to rinse the lens thoroughly enough to remove all residual enzymatic matter. As a result, active enzymes may come into contact with the wearer's eye and thereby injure the wearer. Furthermore, in some instances, even thoroughly rinsing the lenses may not be totally effective in removing residual enzymatic matter bound to the lens.

Because of the issues outlined above, and other concerns, prior art apparatus and methods have not been entirely satisfactory. One apparatus which overcomes some of these shortcomings is described in U.S. Pat. No. 5,657,506, the disclosure of which is incorporated by reference herein. This apparatus utilizes a two-piece lens container wherein the exposed surfaces of two sponge members, wetted with an opthalmologically compatible solution, and each having thereon a reactive layer formed of a highly porous non-abrasive relatively polymeric material such as polytetrafluoroethylene (PTFE), are brought into compressive engagement with the optical surfaces of an interposed contact lens, whereby the reactive layers cause contaminants to migrate from the lens to the reactive layers. Similar alternate apparatus are also disclosed in U.S. Pat. No. 6,138,312, the disclosure of which is also incorporated by reference herein.

U.S. Pat. No. 5,783,532 recognizes the related problem of residual enzymatic matter on the lens and discloses an enzymatic cleaning composition containing a component which is asserted to be effective when released to deactivate the enzyme. This system, however, even if effective, still relies on the user to complete the steps necessary to deactivate the enzyme and to wait for complete inactivation to occur before placing the cleaned lens in the eye. In such a system, the problems associated with residual enzymatically active matter on the lens still exist if the lens is removed from the cleaning composition prior to complete inactivation. Furthermore, even if inactivated, inactive enzymatic protein may still adhere to the lens and may cause an associated allergic reaction.

OBJECTS OF THE INVENTION

Accordingly, it is a general object of the present invention to provide a new and improved apparatus for cleaning contaminated contact lenses.

It is a more specific object of the invention to provide an apparatus for cleaning contaminated contact lenses which is simple to use and economical to manufacture.

It is another object of the invention to provide an apparatus that reduces the steps of cleaning contact lenses by eliminating the need for rubbing and/or any additional solution.

It is a further object of the present invention to provide a disposable limited use apparatus for cleaning contaminated contact lenses having closable liquid-sealed containers within which the lenses are contained while being cleaned.

It is another object of the invention to provide an apparatus that makes it easier to clean lenses while traveling.

It is a further object of the present invention to provide an apparatus for cleaning contaminated contact lenses wherein the lenses are enzymatically cleaned.

It is a further object of the invention to provide a self contained apparatus for cleaning contaminated contact lenses wherein the optical surfaces of the lenses may be received in a wetted environment in contiguous contact with a reactive medium whereby lenses can be generally cleaned without the application of abrasive force (e.g. without the force caused when rubbing the lens by hand).

SUMMARY OF THE INVENTION

The invention is directed to an apparatus for cleaning a contact lens having generally opposed optical surfaces where the apparatus includes two housing sections joined to form a chamber for receiving the lens wherein each section has an operative face facing the chamber and each face includes a reactive layer dimensioned and arranged to come into engagement with respective optical surfaces of a lens positioned therebetween, at least one of the operative faces including a plurality of radially inward shoulder portions to limit the lateral movement of the lens and to ensure proper capture thereof.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a perspective view of a lens treatment apparatus in accordance with the present invention in a closed position.

FIG. 2 is a perspective view of the lens treatment apparatus of FIG. 1 with the right cover shown in the open position and the left cover shown in the locked position.

FIG. 3 is a close up view of the latch of FIG. 2 in the locked position.

FIG. 4 is a perspective view of the lens treatment apparatus of FIG. 1 with the right cover shown in the open position and the left cover engaged by a user.

FIG. 5 is a close up view of the latch of FIG. 4 in the open position.

FIG. 6 is a perspective view of the open cover of FIG. 2.

DETAILED DESCRIPTION OF THE ILLUSTRATED EMBODIMENT

Figure 7:
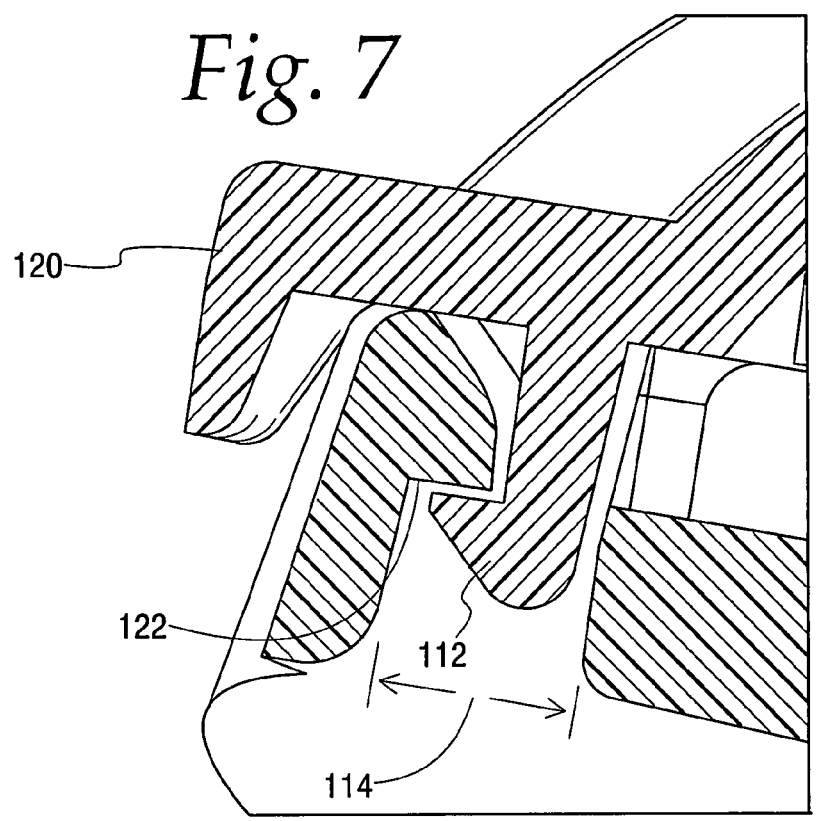
FIG. 7 is a close up cross-sectional view of the locked latch of FIG. 3.

Referring to the figures, and particularly to FIGS. 1-5, a lens treatment apparatus 100 constructed in accordance with the invention is seen to include a single piece case 102 including a left cover 104 and a right cover 106 and a common body 108. In a preferred embodiment, the left cover 104 and the right cover 106 are rotatably coupled to the body 108 by an over-center hinge 110. When rotated inwards to the center of the case 102, the left cover 104 and right cover 106 may be latched to the body 108 by the latching mechanism illustrated in FIG. 3. The latching mechanism comprises a pair of lateral slots 114 made in the body 108 and a latch 112 disposed on the covers (104, 106). In the closed position of FIGS. 2 and 3, the latch 112 engages the slot 114 thereby locking the left cover 104 and/or the right cover 106 to the body 108. Preferably (as best shown in FIG. 7) latch 112 has a beveled or canted edge to facilitate engagement with slot 114 and concomitantly slot 114 preferably has a lip 122 to facilitate the engagement with latch 112. The latch features require squeezing both front 116 and back 118 sides in order to release the mechanism, see FIGS. 4 and 5.

FIGS. 6 and 7 are a closer illustration of the latch mechanism. In order to open the latch, the user applies pressure to a flange 120 coupled to the latch 112 towards the center of the case 102 enabling the latch 112 to clear the lip 122 of the slot 114 of the body 108 of the case 102. The disclosed squeeze to release latch mechanism allows the case to be opened without splashing that would otherwise occur with a push or pull snap design. The squeeze and release mechanism further reduces the risk that the case will accidentally open while a user carries it.

As discussed earlier, the left cover 104 and right cover 106 are coupled to the body 108 by a pair of over center hinges 110. For economical and reliable manufacturing, these over center hinges 110 are preferably constructed as living hinges.

Figure 8:
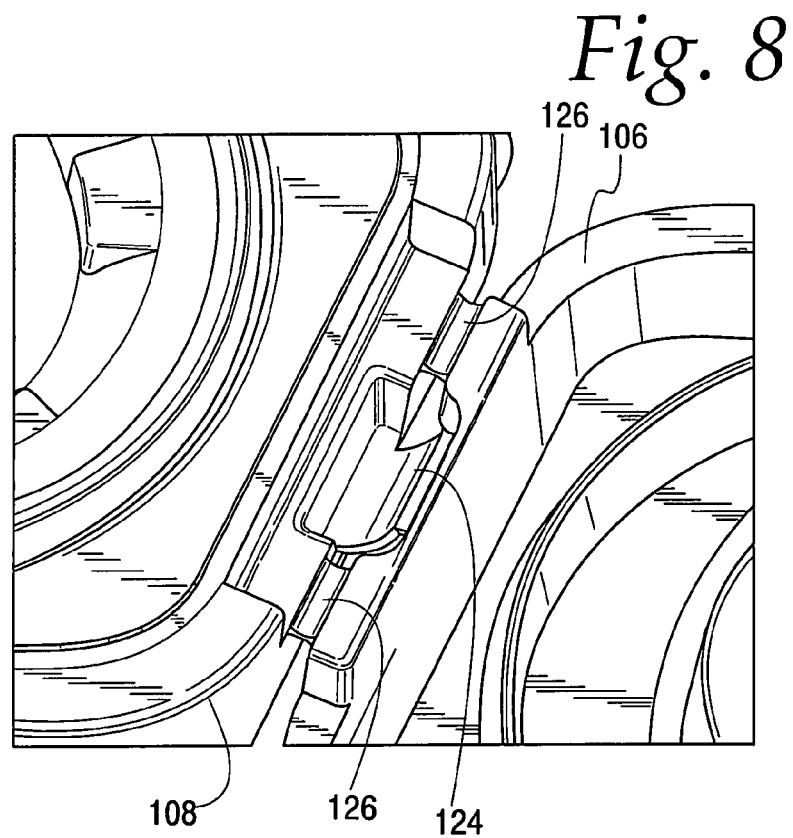
FIG. 8 is a perspective view of an over-center hinge of a lens treatment apparatus in accordance with the present invention.
Figure 9:
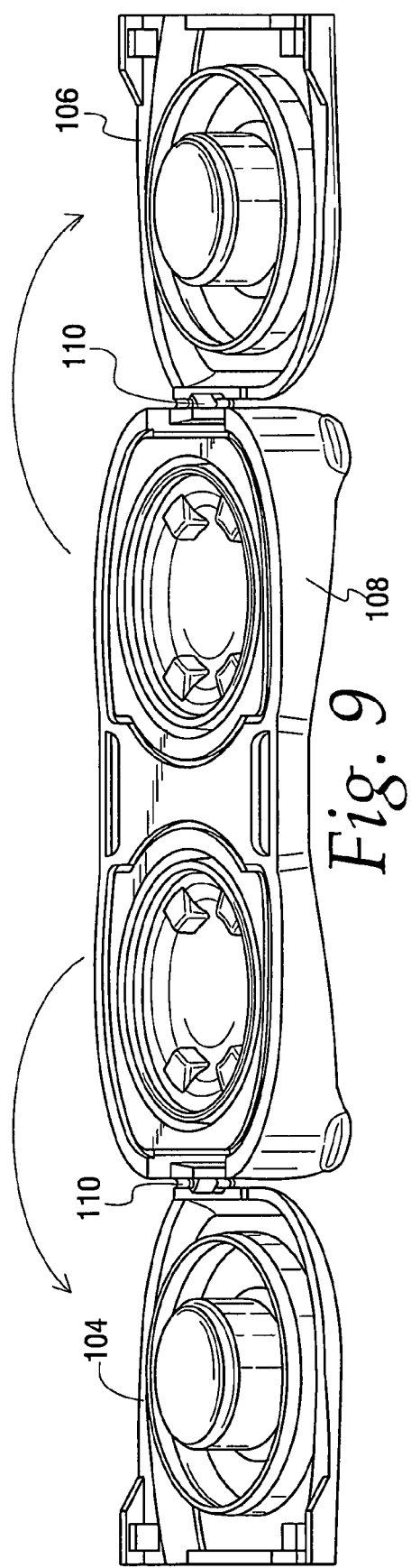
FIG. 9 is an elevated view of the lens treatment apparatus of FIG. 1 shown in the open position.

Once unlatched, the left cover 104 and the right cover 106 of the case are kept open by the over-center hinge 110. More particularly, and as shown in FIG. 1, each over-center hinge 110 includes a center biased member 124 and a pair of side stabilizing members 126. When in the closed position, the center biased member 124 urges the right cover 106 towards the closed position. Referring now to FIGS. 8 and 9 however, once the user opens the right cover 106 past a threshold distance, the center biased member 124 is consequently forced to bias the right cover 106 in the opposite direction and the remaining displacement of the right cover 106 to the fully open position becomes automatic. The over-center hinge 110 used on the left cover 104 operates identically. This snap action living hinge design keeps the cover open to permit ergonomic access for contact lens insertion and removal. As shown in FIG. 9, the covers (104 and 106) open outward to provide clear access for the user to insert and remove contact lenses. The three piece wide living hinge feature of the preferred embodiment promotes stability for the seal (infra) and keeps the cover in a more stable position that is accordingly less likely to spill during use. The over-center hinge 110 can be engineered to fail after a predetermined number of uses to ensure that the case is not used indefinitely.

Figure 10:
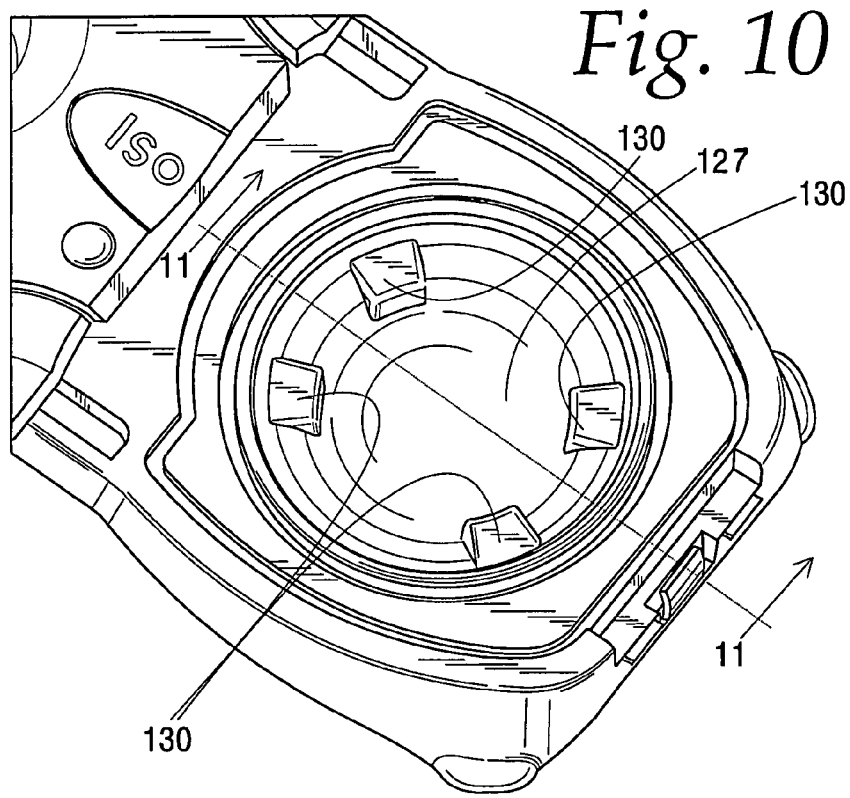
FIG. 10 is a perspective view of half of the body of FIG. 2.
Figure 11:
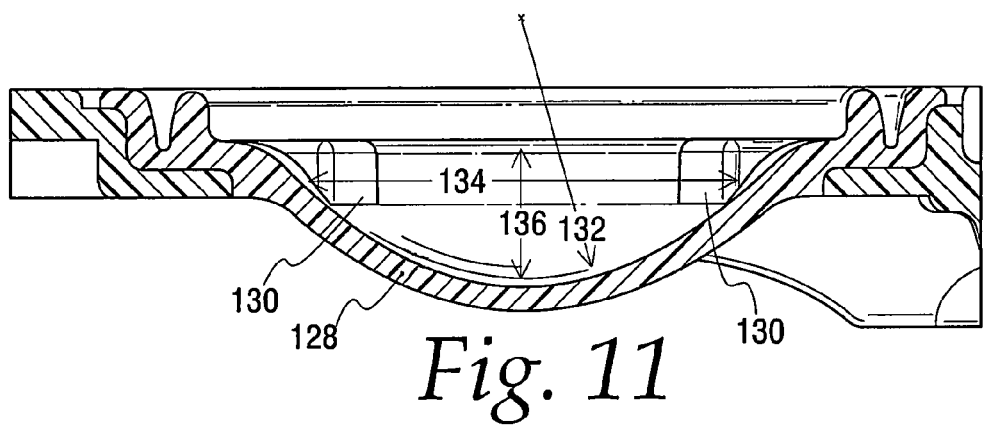
FIG. 11 is a cross-sectional view of the body taken along lines 11-11 of FIG. 10.

Turning to FIG. 10, a pair of chambers 127 are formed in the body 108 of the case 102 (only the right chamber 127 is illustrated in FIG. 10; the left chamber is identical). The chamber 127 is constructed of a pliant material and is designed to conform to the various soft contact lens geometries. A number of protrusions 130 are formed within the chamber 127, and are configured to limit the lateral movement of the contact lens when the cover (104, 106) is closed over the body 108, thereby ensuring proper capture of the contact lens. The illustrated location and size of the protrusions 130 are designed to allow for ergonomic access to the contact lens while still limiting the lateral movement of the contact lens. Referring to FIG. 11, the radius 132 and diameter 134 of the lens contact surface 128 is designed to accommodate the vast majority of sizes of contact lenses. The depth 136 of the chamber 127 is designed to accommodate the desired fill volume (liquid and lens) and to facilitate ergonomic access to the contact lenses.

Figure 12:
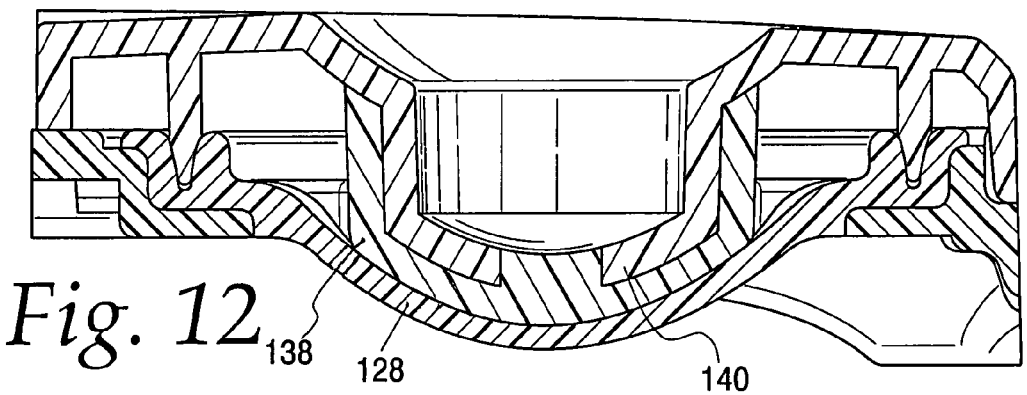
FIG. 12 is a side cross-sectional view of one half of the lens treatment apparatus taken along lines 12-12 of FIG. 1.

Once the user's contact lenses are firmly positioned within the chamber 127 and restrained by the protrusions 130, the covers (104, 106) are locked in place via the engagement of latch 112 and slot 114 as described above. Referring now to FIG. 12, inwardly projection 140 is formed in each of the covers (104, 106). As illustrated, projection 140 is generally cylindrical, with a spherical endpoint, which is shaped to interface with the concave side of a soft contact lens. Each projection 140 is covered with a cover elastomer 138, which is designed to be a close fit with the body elastomer 128 in order to ensure that the contact lens is in firm contact on both sides with elastomer (128, 138). The cover elastomer 138 is disposed over a rigid material that is used to form the case 102 to provide a firm, conforming surface for the body elastomer 128 and contact lens. Case 102 can also be formed from multiple compositions, such as for example, being formed from a two-slot mold wherein the main body of case 102 is one composition and a different composition can be used for elastomers 128 and 138. It will further be appreciated that projections 140 can be of the same composition as used for elastomers 128 and 138 and that projection 140 and its cover elastomer 138 can be a single composition.

As explained later, placing a pair of contact lenses and cleaning liquid into the disclosed case will cause contaminants to migrate off of the lenses to the elastomers 128 and 138 after sufficient time elapses. After the lenses have been cleaned, the user then squeezes the flange 120 of the latch towards the center of the case 102 as previously described to open the covers (104, 106). The firm contact of the lenses between the cover elastomer 138 and the body elastomer 128 when the case is closed creates a physical environment wherein the lenses tend to remain on the cover elastomer 138 on opening the case. Accordingly, the lenses are presented for removal on the convex engaging surface once the case is opened. Rather than having to retrieve the lens from the chambers 127 and manipulating them by turning them over for use, the user need only remove the lens from the cover elastomer 138 and directly place over the eye. This is especially advantageous for the user as any lens manipulation increases contaminants as well as the likelihood of folding and/or tearing.

Figure 13:
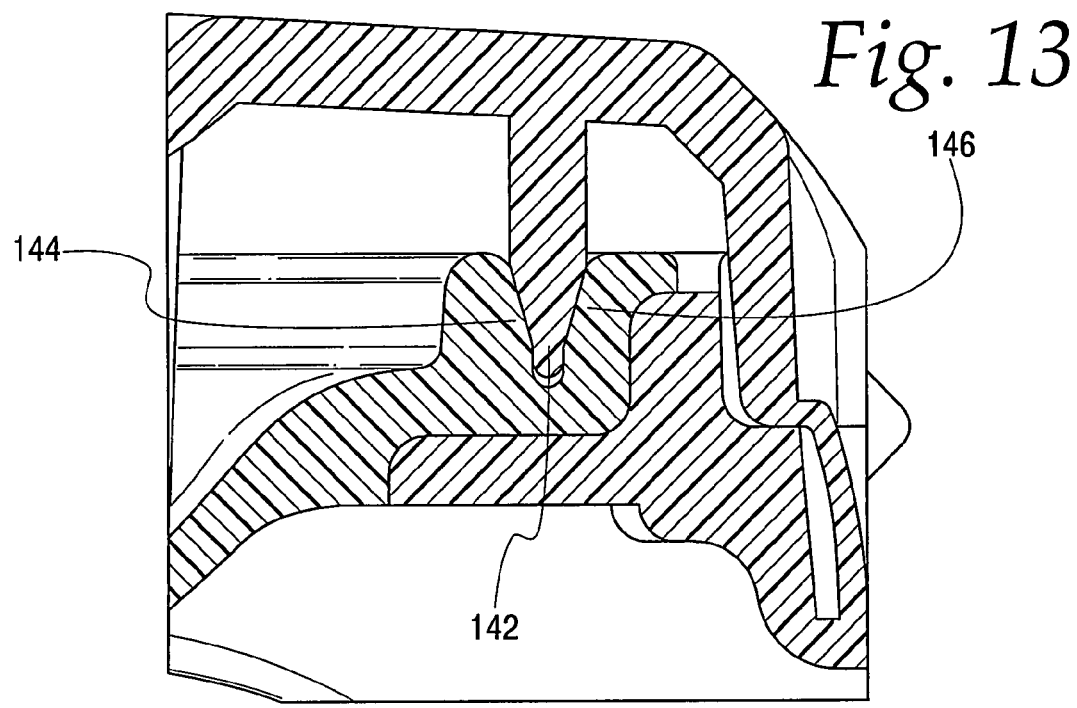
FIG. 13 is a close up view of the cover and body seal of FIG. 12.

FIG. 13 illustrates the dual sealing on the preferred embodiment of the present invention. This dual seal provides a double moisture barrier and eliminates any need for a foil seal. The seal features are tapered to be self aligning and to provide an aggressive seal across the tolerance range of injection molding. More particularly, the cover seal 142 fits firmly between the body inner seal 144 and the body outer seal 146. The body inner seal 144 acts as a splash guard to prevent solution from being splashed from the assembly during contact lens access and/or closure of the cover (104, 106). The body inner seal 144 is pliant to allow for an aggressive seal without excessive force required to close the cover (104, 106). This seal can be further described, referring to FIG. 2, as the utilization of a rim 148 received within a channel 150.

Figure 14:
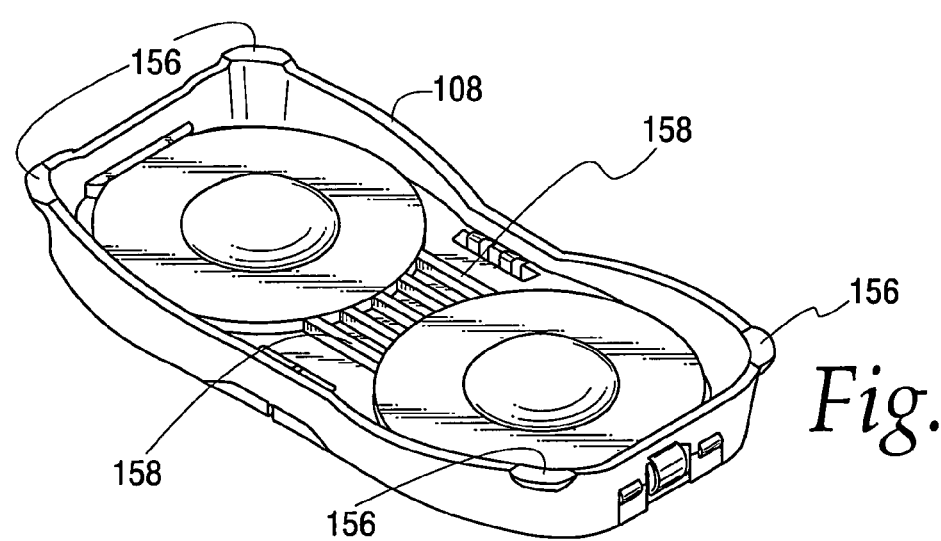
FIG. 14 is a perspective view of the bottom of the lens treatment apparatus of FIG. 1.

The case 102 has been designed with a number of other unique features. Referring back to FIG. 1, a company logo 152 is molded into the covers (104, 106) so that one having a sight impediment can readily determine the left side from the right side. Similarly, a raised bump 154 or any other unique indicator can be used to distinguish the left cover 104 from the right cover 106. Certain users may have different prescriptions for their left contact lens and their right contact lens, and the distinct markings of the case 102 allow a user keep track of which side has which lens. The case 102 has also been provided with a number of stabilizing feet 156, which stabilizes the case in environments that are subject to vibration (such as airplanes or trains), and/or where perfectly flat surfaces are not available. Further, as can be seen in FIG. 14, although the underside of the body 108 is spacious, the left and right sides are re-enforced with bars 158 to keep the case from twisting. This further stabilizes the case while the user opens and closes the case.

Figure 15:
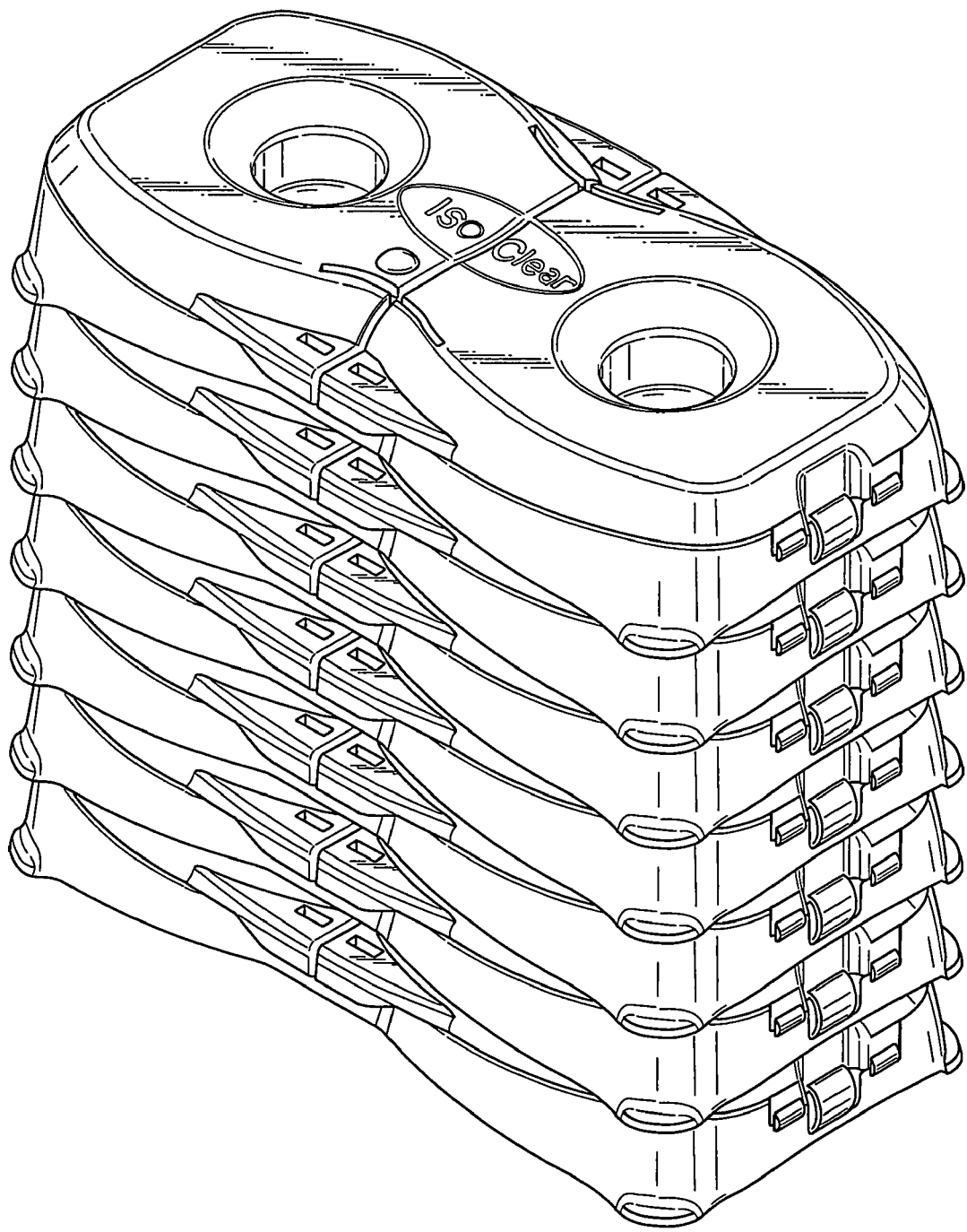
FIG. 15 is a perspective view of multiple lens treatment apparatus of FIG. 1 shown nesting one a top another.

While the spaciousness of the underside makes the case lightweight, another design feature is the ability to stack cases on top of one another. In fact, as FIG. 15 illustrates, multiple cases can easily be nested for ease in packaging and transport. The covers (104, 106) of one case nests within the underside (FIG. 14) of another to save space as well as prevent sliding of any case within a stack of cases.

The case 102 can be constructed from any suitable material and can be constructed for single use or repeated use applications. For example case 102 can be constructed from polymeric materials, including synthetic polymers such as polyethylene, polypropylene, polyvinyl chloride, polyethylene terephthalate and other similar materials and can include common additives including, but not limited to, fillers, pigments and plasticizers. Case 102 can also be constructed from natural materials such as cellulose. For example, a preferred material for case 102 is a fibrous cellulose which is compliant and absorbent.

When using an absorbent material such as fibrous cellulose for case 102 it may be desirable to treat or coat the exterior of the case 102 to provide the case 102 with a moisture impermeable barrier to prevent leakage of solution from the case 102. For example, a wax can be applied to the exterior of an absorbent material such as a cellulose container body to provide a moisture barrier. Alternatively, a plastic coating or metal foil can be applied to the exterior of such a material to provide a moisture barrier. Alternatively, case 102 can be constructed from a moisture impermeable shell such as a shell made from a synthetic polymer and an absorbent cellulose insert dimensioned to fit within such shell.

The preferred material used to make the outside of case 102 is Huntsman Polypropylene 13T10A, although it could be made of several different materials. The advantage of this polypropylene is that the case can be made in one part using the living hinge as described above. It is envisioned that other crystalline materials such as High Density Polyethylene would also work as a single piece with a living hinge.

The teachings of U.S. Pat. Nos. 6,662,397, 6,343,399, 6,280,530, 6,134,736, 5,891,258 and 5,657,506 further incorporated herein by reference, describe the functional lens treatment aspects of the disclosed lens treatment apparatus. In connection therewith, body lens contact surface (body elastomer) 128 and cover lens contact surface (cover elastomer) 138 serve as non-abrasive, reactive surfaces which attract contaminant matter from the lens. As set forth in, for example, U.S. Pat. No. 5,657,506, incorporated by reference herein, these reactive surfaces may be formed from, among other compositions, a highly porous non-abrasive relatively polymeric material such as polytetrafluroethylene (PTFE), polyvinylidene fluoride (PVDF), polypropylene, polyethylene, polyacrylonitrile, polymethylmethacrylate, polysulfone, polycarbonate, cellulose acetate, as well as, for example, charged surface cellulosics, polyamides, and nylon based compositions.

Various TPE (thermoplastic elastomer) materials can be used to meet the mechanical requirements of body lens contact surface 128 and cover lens contact surface 138 to conform to the various lens sizes and provide a water tight seal. However, preferred elastomers include styrenic block copolymer (SBC) elastomers and more preferably block copolymers of polystyrene-poly (ethylene/butylenes)-polystyrene also knows as SEBS (Styrene Ethylene Butylene Styrene Block Copolymer). The preferred material to be used with the features described in the present invention are the G lines of SEBS polymer compounds marketed by GLS Corporation under the trade names of DYNAFLEX® and KRATON® (Dynaflex is a registered trademark of GLS Corporation and Kraton is a trademark of KRATON Polymers U.S. LLC), including, for example, Dynaflex G2711 elastomer compound and Kraton G2705 SEBS plastic material. For preferred embodiments of the present invention the preferred block compolymer is Dynaflex G2711 Thermoplastic Elastomer.

The block copolymers can be compounded with other materials such as oils, other polymers and additives. It has unexpectedly been found that blending the thermosplastic elastomer with a fluorinated compound not only provides an elastomer that has good mechanical properties but also provides an elastomer that has enhanced reactive properties relative to the contaminants on the contact lens. In that regard, it was known from U.S. Pat. No. 5,657,506, incorporated by reference herein, that the reactive layer may be formed from highly porous non-abrasive relatively polymeric material such as polytetrafluoroethylene (PTFE) and polyvinylidene fluoride (PVDF), among others. However, it was not earlier appreciated that blending a relatively small amount of a fluorinated compound with a thermoplastic compound would provide a thermoplastic resin having both good mechanical properties and enhanced reactive properties relative to the contaminants on the contact lens.

For purposes of the present invention, preferred fluoro additives are those based on fluorinated synthetic oil (perfluoropolyether) such as those marketed by E.I. du Pont de Nemours and Company ("DuPont"). Particularly effective in the present application is Fluoroguard® SG (Fluoroguard is a registered trademark of DuPont) perfluoropolyether which is a colorless, odorless, nonflammable, and chemically inert polymer compounding additive based on fluorinated synthetic oil with a typical value for average molecular weight of 4950, a typical density of 1.9 g/mL at 23°, a typical pour point of −36° C., and a typical refractive index of 1.3 nD25. Preferably the fluorinated composition is added within a range of 0.1 to 5.0 percent, more preferably 0.1 to 2.0 percent and even more preferably 0.5 to 2.0 percent (by weight) of the thermoplastic material. A particularly preferred composition of the reactive layers is Dynaflex® G2711 thermoplastic resin compounded with Fluoroguard® SG fluorinated synthetic oil wherein the fluorinated synthetic oil is compounded at a 2% weight ratio to the thermoplastic compound. The compositions used for the reactive surfaces preferably have a Shore A hardness of 25 to 60, more preferably a Shore A hardness of 35 to 50 and most preferably a Shore A hardness of 40 to 45.

Prior to use of the apparatus is preferably moistened with an opthalmologically compatible solution. Various opthalmologically compatible solutions can be used including wetting solutions, saline solutions, non-enzymatic cleaning solutions, enzymatic cleaning solutions, disinfectant solutions, and combinations thereof. The solution can be independently purchased, prepackaged with the apparatus or placed in the apparatus prior to insertion of the contact lens. The solution is placed in the body 108 to the desired fill volume and preferably is present in a sufficient amount to flow around the ends of reactive contact surfaces 128 and 138 and around and under the lenses providing a fluid communication interface when the apparatus is in the closed position. Providing a wetted contact environment facilitates migration of the contaminants from the lens to the reactive contact surfaces 128 and 138.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A contact lens cleaning apparatus for cleaning contact lenses of the type having generally opposed optical surfaces, comprising: a housing having first and second housing sections joinable to form a chamber for receiving the lens; said first housing section having an operative face facing said chamber; said second housing section having an operative face facing said chamber; a portion of each of said operative faces each including a reactive layer, said operative faces and said reactive layers dimensioned and arranged whereby said reactive layers come into engagement with respective optical surfaces of a lens positioned therebetween when said first and second housing sections are joined together; at least one of said operative faces including a plurality of circumferentially positioned shoulder portions to limit the lateral movement of the contact lens and to ensure proper capture of the contact lens between the reactive layers of the operative faces when said first and second housing sections are joined together.

2. The contact lens cleaning apparatus of claim 1 wherein said first housing section is a bottom housing and said second housing section is a top housing and said shoulder portions are located in the bottom housing section.

3. The contact lens cleaning apparatus of claim 2 wherein said shoulder portions comprise one or more pairs of spaced, circumferentially opposed shoulder portions.

* * * * *